United States Patent
Stober et al.

(10) Patent No.: US 7,829,512 B2
(45) Date of Patent: Nov. 9, 2010

(54) METHOD AND EQUIPMENT FOR MAKING A COMPLEX LITHIUM GREASE

(75) Inventors: Spencer Troy Stober, Woodbury, NJ (US); Todd Timothy Nadasdi, Mount Laurel, NJ (US); John Phillips Doner, Sewell, NJ (US); John Kenneth Graham, Ardmore, PA (US); Norman Charles Sundstrom, Yardley, PA (US); Paul Richard Grives, Lumberton, TX (US); Barbara Anne Carfolite, Wallingford, PA (US); James Fredrick Van Auken, Beaumont, TX (US); James E. Spagnoli, Mount Laurel, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 1233 days.

(21) Appl. No.: 10/957,375

(22) Filed: Oct. 1, 2004

(65) Prior Publication Data
US 2005/0082014 A1    Apr. 21, 2005

Related U.S. Application Data

(60) Provisional application No. 60/512,581, filed on Oct. 17, 2003.

(51) Int. Cl.
*C10M 117/06* (2006.01)
*C10M 159/12* (2006.01)

(52) U.S. Cl. .................. 508/512; 508/496; 508/498; 508/519; 508/539

(58) Field of Classification Search .............. 508/512, 508/539, 496, 519
See application file for complete search history.

(56) References Cited

U.S. PATENT DOCUMENTS

| | | | | |
|---|---|---|---|---|
| 2,478,917 | A | 8/1949 | Hain | 252/32 |
| 2,483,282 | A | 9/1949 | Houlton | 252/32 |
| 2,946,751 | A | 7/1960 | Beerbower et al. | 252/40 |
| 3,300,457 | A | 1/1967 | Schmid et al. | 260/88.2 |
| 3,475,335 | A | 10/1969 | Greene et al. | 252/39 |
| 3,475,337 | A | 10/1969 | Green, Jr. et al. | 252/41 |
| 3,635,901 | A | 1/1972 | Urgesi et al. | 260/75 M |
| 3,929,651 | A * | 12/1975 | Murray et al. | 508/512 |

(Continued)

FOREIGN PATENT DOCUMENTS

CA    855685    11/1970

(Continued)

OTHER PUBLICATIONS

Samil Beret et al, "Continuous Lithium Complex Grease Formation Using Metyl Esters of 12-Hydroxystearic Acid and Azelaic Acid", NLGI Spokesman, Feb. 1999, vol. 62, No. 11, pp. 14-17.

(Continued)

*Primary Examiner*—Ellen M McAvoy (57) ABSTRACT

A continuous process for preparing lithium complex greases improved by using a complexing agent of dimethyl glutarate, dimethyl adipate, glutaric acid, adipic acid, or mixtures thereof, and preferably also a specialized flash chamber to achieve a penetration split (60X-UW) of within −20 mm/10 to 10 mm/10, a roll stability (D1831) of <30 mm/10, and a dropping point (D2265) of >240° C.

16 Claims, 6 Drawing Sheets

Schematic Representation on Flash Chamber Design

U.S. PATENT DOCUMENTS

| | | | | |
|---|---|---|---|---|
| 4,297,227 | A | 10/1981 | Witte et al. | 252/18 |
| 4,312,769 | A | 1/1982 | Pratt | 252/35 |
| 4,392,967 | A | 7/1983 | Alexander | 508/454 |
| 4,435,299 | A | 3/1984 | Carley et al. | 508/512 |
| 4,444,669 | A | 4/1984 | Wittse, Jr. et al. | 252/41 |
| 4,483,776 | A | 11/1984 | Witte, Jr. et al. | 508/512 |
| 4,582,619 | A | 4/1986 | Carley et al. | 508/512 |
| 4,597,881 | A | 7/1986 | Iseya et al. | 252/41 |
| 4,655,948 | A | 4/1987 | Doner et al. | 252/49.6 |
| 4,664,820 | A | 5/1987 | Magauran et al. | 252/28 |
| 4,701,272 | A | 10/1987 | Mori et al. | 252/28 |
| 4,711,732 | A | 12/1987 | Arakawa et al. | 252/28 |
| 4,719,023 | A | 1/1988 | MacPhail et al. | 252/39 |
| 4,724,092 | A | 2/1988 | Fukui et al. | 252/54 |
| 4,743,386 | A | 5/1988 | Doner et al. | 252/49.6 |
| 4,749,502 | A | 6/1988 | Alexander et al. | 252/35 |
| 4,781,850 | A | 11/1988 | Doner et al. | 252/49.6 |
| 4,961,868 | A | 10/1990 | Doner et al. | 252/32.7 E |
| 5,043,085 | A | 8/1991 | Kinoshita et al. | 252/49.9 |
| 5,084,194 | A | 1/1992 | Doner et al. | 252/32.7 E |
| 5,100,568 | A | 3/1992 | Takahashi et al. | 252/28 |
| 5,110,489 | A | 5/1992 | Stadler et al. | 252/35 |
| 5,110,490 | A | 5/1992 | Pink et al. | 252/35 |
| 5,145,591 | A | 9/1992 | Kinoshita et al. | 252/51.5 R |
| 5,186,849 | A | 2/1993 | Toya et al. | 252/21 |
| 5,190,682 | A | 3/1993 | Harris | 252/56 S |
| 5,211,860 | A | 5/1993 | Doner et al. | 252/32.7 E |
| 5,211,863 | A | 5/1993 | Doner et al. | 252/49.6 |
| 5,236,607 | A * | 8/1993 | Harris et al. | 508/536 |
| 5,242,610 | A | 9/1993 | Doner et al. | 252/38 |
| 5,254,273 | A | 10/1993 | Kageyama et al. | 252/34 |
| 5,338,467 | A | 8/1994 | Olson et al. | 252/33.4 |
| 5,391,309 | A * | 2/1995 | Brewster et al. | 508/512 |
| 5,449,471 | A | 9/1995 | Ozaki et al. | 252/42.7 |
| 5,464,548 | A | 11/1995 | Cahoon et al. | 252/18 |
| 5,476,600 | A | 12/1995 | Witte | 252/38 |
| 5,487,839 | A | 1/1996 | Vinci et al. | 252/49.9 |
| 5,494,608 | A | 2/1996 | Kamakura et al. | 252/42.7 |
| 5,583,284 | A * | 12/1996 | Martin et al. | 73/54.09 |
| 5,589,443 | A | 12/1996 | Denton et al. | 508/150 |
| 5,595,965 | A | 1/1997 | Wiggins | 508/491 |
| 5,607,906 | A | 3/1997 | Okaniwa et al. | 508/168 |
| 5,612,297 | A | 3/1997 | Kamakura et al. | 508/363 |
| 5,614,478 | A | 3/1997 | Gates | 508/136 |
| 5,714,444 | A | 2/1998 | Yokouchi et al. | 508/539 |
| 5,773,394 | A | 6/1998 | Wan et al. | 508/591 |
| 5,851,969 | A | 12/1998 | Andrew et al. | 508/556 |
| 5,854,185 | A | 12/1998 | Roth et al. | 508/492 |
| 5,858,934 | A | 1/1999 | Wiggins et al. | 508/486 |
| 6,172,012 | B1 | 1/2001 | Kumar et al. | 508/165 |
| 6,232,278 | B1 | 5/2001 | Shibayama et al. | 508/539 |
| 6,255,257 | B1 | 7/2001 | Yamada et al. | 508/172 |
| 6,258,760 | B1 | 7/2001 | Ozaki et al. | 508/365 |
| 6,265,361 | B1 | 7/2001 | Akiyama et al. | 508/462 |

FOREIGN PATENT DOCUMENTS

| | | |
|---|---|---|
| EP | 0151825 | 11/1989 |
| GB | 1046090 | 12/1964 |
| GB | 1280525 | 7/1972 |
| GB | 2127430 A | 4/1984 |
| JP | 11279582 A | 10/1999 |
| JP | 200019979 A | 4/2000 |

OTHER PUBLICATIONS

S. Diane Graham et al, "Grease Manufacturing Methods", NLGI Spokesman, Dec. 1992, vol. 56, No. 9, pp. 17-363 to 26-372.
Arnold C. Witte et al, "Grease Making in the 90's" "A comparison of Commercial Grease Manufacturing Processes", NLGI Spokesman, Jun. 1994, vol. 58, No. 3, pp. 13-97 to 23-107.
Lu Zhi Zhong et al, "Production at China's Largest Lubricating Grease Plant", NLGI Spokesman, May 1995, vol. 59, No. 2, pp. 24-26.
C. V. Chandrasekharan et al, "Thermal and Mechanical Behavior of Lithium Greases from Four Processing Systems", NLGI Spokesman, Apr. 1997, vol. 61, No. 1, pp. 8-19.
Yang Zheng Yu et al, "Development of the Lubricating Grease Industry in China", NLGI Spokesman, May 1987, pp. 63-67.
Yury L. Ischuk, "Problems of Grease Research, Manufacture and Application", NLGI Spokesman, Dec. 1990, vol. 54, No. 9, pp. 11-365 to 13-367.
A. C. Witte et al, "The Texaco Continuous Grease Process", NLGI Spokesman, Jul. 1980, pp. 133-136.
W. B. Green et al, "Texaco's Continuous Grease Manufacturing Process", NLGI Spokesman, Jan. 1969, pp. 368-373.
R. T. Macdonald et al, "Preparation and Properties of Greases", The Oil and Gas Journal, Jan. 5, 1953, pp. 54-61.
W. B. Green et al, "Continuous Grease Manufacture", Lubrication, 1969, vol. 55, No. 1, pp. 1-12.
G. M. Hain et al, "Laboratory Machine for the Continuous Production of Grease", Industrial and Engineering Chemistry, Apr. 1947, vol. 39, No. 4, pp. 506-507.
Mark D. Rosenzweig, "Compact Units Are First To Make Grease Continuously", Chemical Engineering, May 3, 1971, pp. 67-69.
J. Bergeron et al, "Construction (and Design by Sta-Lube Inc.) of a Compact, Automated (8 Million Lb/Yr) Grease Plant", API Literature Abstracts 1964-1995#9, NLGI Spokesman V 47, N 7, 245 (Oct. 1983).
Machinoimport et al, "Lithium Greases for Car Building", API Literature Abstracts 1964-1995#9, Process Technol. Int. V 18, N 6-7, 243 (Jun.-Jul. 1973).
Tarmac Construction Ltd., "New Grease Plant in U.S.S.R. Uses Mainly U.K. Know-How", API Literature Abstracts 1964-1995#9, Process Eng. (London), 6 (Jan. 1973).
A. D. Stakhursky et al, Installation for Continuous Grease Production at the Berdjansk Petro-Oil Plant [in the Ukraine], API Literature Abstracts 1964-1995#9, NLGI Spokesman V 56, N 12, 486-89 (Mar. 1993).
A. D. Stakhursky, "Installation for Continuous Grease Production at the Berdjansk Petro-Oil Plant", API Literature Abstracts 1964-1995#9, NLGI Spokesman V 56, N 7, 274-85 (Oct. 1992).
L. D. McAfee et al, "Value Engineering the Automated (Lithium Soap Grease Making) Batch Process", API Literature Abstracts 1964-1995#9, NLGI Spokesman V 52, N 4, 133-38 (Jul. 1988).
D. D. Logbinenko et al, "Operating Experience with an Installation for the Continuous Manufacture of Lubricating Greases", API Literature Abstracts 1964-1995#9, Neftepererab. Neftekhim. (Moscoe) (3) 13-16, Chem. Abstr. No. 159081, V 106, N 20.
L. D. McAfee, "Value Engineering the Automated (Grease Soap) Batch Process", API Literature Abstracts 1964-1995#9, NLGI Spokesman V 51, N 7, 276-89 (Oct. 1987).
G. Schmidt et al, "Successful Continuous Greasemaking at Peine (West Ger.), with the OJS (Oelwerke Julius Schindler G.M.B.H.)/BP (Group) Process", API Literature Abstracts 1964-1995#9, NLGI Spokesman, V 48, N 9, 329-34 (Dec. 1984).
S. Yu Omarov et al, "The Continuous Production of Lithium-Based Greases", API Literature Abstracts 1964-1995#9, Khim I Tekhnol Topl I Masel V 14, N 9, 25-28 (1969).
I. G. Fuks et al, "Manufacture of Lithium Greases by the Continuous Method", API Literature Abstracts 1964-1995#9, Khim I Tekhnol Topl I Masel V 13, N 5, 20-22 (1968).
Yu N. Shekhter et al, "Universal Scheme for the Continuous Production of Lubricants", vol. 14, No. 5, pp. 339-342, (1969).
Phil Danielson, "The Vacuum Chamber: Volume or Surface Area?", *A Journal of Practical and Useful Vacuum Technology*, pdanielson@vacuumlab.com.

* cited by examiner

Figure 1
Schematic Representation on Flash Chamber Design

Figure 2
Schematic Representation of the Continuous Grease Process
Injection Point Locations

METHOD AND EQUIPMENT FOR MAKING A COMPLEX LITHIUM GREASE

This application claims the benefit of U.S. Ser. No. 60/512,581 filed Oct. 17, 2003.

FIELD OF THE INVENTION

The invention relates to continuous processes for manufacturing soap thickened complex grease compositions and flash chambers useful in the processes.

BACKGROUND

Kettle, contactor, or other batch processes are usually used to make lithium complex greases from a fatty acid such as 12-hydroxy stearic acid and a complexing agent such as a smaller chain diacid. Complex greases manufactured by these processes can exhibit good structural stability, as measured by Two-Hour Room Temperature Shell Roll Stability (ASTM D1831), 10,000 or 100,000 stroke worked penetration (ASTM D217), and Penetration Split (60 stroke worked penetration minus unworked penetration).

While several simple lithium greases have been made by a continuous in-line grease process, a review of the literature only found one type of lithium complex grease made by this method. Wittse, et al. in U.S. Pat. No. 4,444,669 describes an example of this type of lithium complex grease by a continuous in-line grease process with azelaic acid or dimethyl azelate complexing agents. However, Wittse's lithium complex grease exhibits poor structural stability, efficiency, 10,000 stroke penetration, and penetration split.

It would be desirable to be able to make a lithium complex grease in a continuous in-line process that exhibits good structural stability because a continuous in-line process can be more economical than batch type processes. Experience has shown however that the current flash chamber used in simple lithium grease in-line processes do not support sufficiently rapid removal of volatile by-products formed in the process when using diacids and dialkl ether complexing agents needed from lithium complex greases due to excessive foaming of the grease in the flash chamber.

An object of the present invention therefore is to provide a method for making a lithium complex grease having a penetration split (60X-UW) of within −20 mm/10 to +10 mm/10, a roll stability (D1831) of <30 mm/10, and a dropping point (D2265) of >240° C. in a continuous in-line process.

Another object is to provide an improved flash chamber suitable for rapid removal of volatile constituents from viscous materials such as grease.

These and other objects of the invention will become apparent from a reading of the description which follows.

SUMMARY OF THE INVENTION

In the present invention, it has been found that continuous processes can produce high quality soap thickened lithium complex grease compositions when complexed with dialkyl glutarate, dialkyl adipate, glutaric acid, adipic acid, or mixtures thereof. Thus, in one embodiment of the present invention, a process for forming a lithium complex grease in a continuous in-line process by using as a complexing agent a compound selected from the group dialkyl glutarate, dialkyl adipate, glutaric acid, adipic acid, or mixtures thereof. It has also been found that a new flash chamber is capable of removing volatile materials from viscous materials and that this flash chamber is particularily suitable for use in continuous in-line grease processes. Thus another embodiment of the invention is a flash chamber having means for removing volatile components from a saponified complex reaction product while surpressing the extent and height of foaming that normally occurs in such flash chambers.

DETAILED DESCRIPTION

Continuous grease manufacturing processes reacts a saponifiable material with an aqueous solution of a metal base in a saponification zone at a saponification reaction temperature and superatmospheric pressure to produce a saponification reaction product comprising soap. The saponification reaction temperature is below the soap melting temperature. The saponification reaction product passes through a pressure reducing means to effect pressure reduction to flash vaporize substantially all the water present in the saponification reaction product. The saponification reaction product then passes through a heat exchanger to heat the saponification reaction product to a dehydration temperature. The saponification reaction product then passes to a dehydration zone to produce a dehydrated saponification reaction product. A first portion of the dehydrated saponification reaction product recycles through a shear valve for conditioning the soap contained therein. Then lubricating oil is added to the recycled dehydrated saponification reaction product to produce a grease product.

A more specific continuous grease manufacturing process for preparing a high dropping point lithium complex soap grease is carried out as follows. A mixture of a dicarboxylic acids, a C12 to C24 hydroxy fatty acid in a mole ratio ranging from about 1:10 to 1:0.5 respectively, a lithium base, and a lubricating oil are continuously introduced into a reaction zone. The lubricating oil (i.e., base oil) employed in making these greases may be any suitable oil having lubricating characteristics, including both conventional mineral oils and synthetic oils or blends thereof. This includes API Group I, II, III, IV, and V and blends having viscosities of between 5 cSt to 3200 cSt at 40° C. The mixture is heated to about 121° C. (250° F.) to 177° C. (350° F.). The reaction zone is under a pressure sufficient to maintain the water in the liquid state. The reaction zone is also under turbulent mixing conditions sufficient to obtain adequate contact between the reactants for a period of time sufficient to obtain a substantially complete reaction to form a lithium complex soap. A product stream is continuously withdrawn from the reaction zone. Then additional lubricating oil is introduced into the product stream to give the grease mixture enough fluidity for circulation. The grease mixture is then continuously introduced into a dehydration zone. The dehydration zone is maintained at a temperature ranging from about 162° C. (325° F.) to 218° C. (425° F.) and at an absolute pressure of 101.35 kPa(a) to 68.35 kPa(a). This ranges from about atmospheric to about 33 kPa (a) (10 inches of mercury) vacuum. The mixture is circulated from the bottom to the top of the dehydration zone through a recycle line and a shear valve having a pressure drop across the valve of from 68.9 kPa(g) to 1034.2 kPa(g) (10 psig to 150 psig). A product stream is continuously withdrawn from the dehydration zone and cooled to provide a finished grease composition. Greases made by this process can also contain additives such as, but not limited to, extreme pressure additives, antioxidants, anti-rust additives, corrosion inhibitors, dyes, antiwear additives, polymers, solid lubricants, etc.

In the process of the invention, suitable saponifiable materials for use in preparation of these grease compositions comprise higher fatty acids containing from about 12 to 24 carbon atoms per molecule and hydroxy substituted higher fatty acids, their glycerides and other esters and mixtures thereof. Methyl-12-hydroxystearate, 12-hydroxy stearic acid, or mixtures thereof are preferred. Importantly, complexing agents are selected from the group consisting of glutaric acid, adipic acid, dialkyl glutarate, dialkyl adipate, and mixtures thereof. The two alkyl groups have one to eight carbon atoms and may be normal, branched, or cyclic. The two alkyl groups may be the same or different. Preferred complexing agents are selected from the group consisting of dimethyl glutarate, dimethyl adipate, glutaric acid, adipic acid, and mixtures thereof. A 10 wt % dimethyl glutarate/90 wt % dimethyl adipate mixture is preferred. Representative structures of two diacids and their diesters are shown below:

Adipic Acid (C6)

Dimethyl Adipate (C6)

Glutaric Acid (C5)

Dimethyl Glutarate (C5)

The base apparatus which can be used to prepare the high dropping point lithium complex soap grease according to the process of the instant invention is described in U.S. Pat. Nos. 1,046,090, 3,475,335, 3,475,337, 4,297,227, 4,435,299, 4,444,669, 4,483,776, 4,582,619, and 5,476,600 all of which are hereby incorporated by reference into the instant application.

When simple lithium soaps are manufactured, the soap usually makes up about 5-7 wt % of the final grease for an National Lubricating Grease Institute (NLGI) 2 grade grease. However, when lithium complex soaps are manufactured, the soap usually makes up about 8-14 wt % of the final grease. Because of this, the greases are much heavier as they are manufactured and the concentration of water (both from initial charge and byproducts) and methanol are higher than in simple lithium greases.

Figure 1:
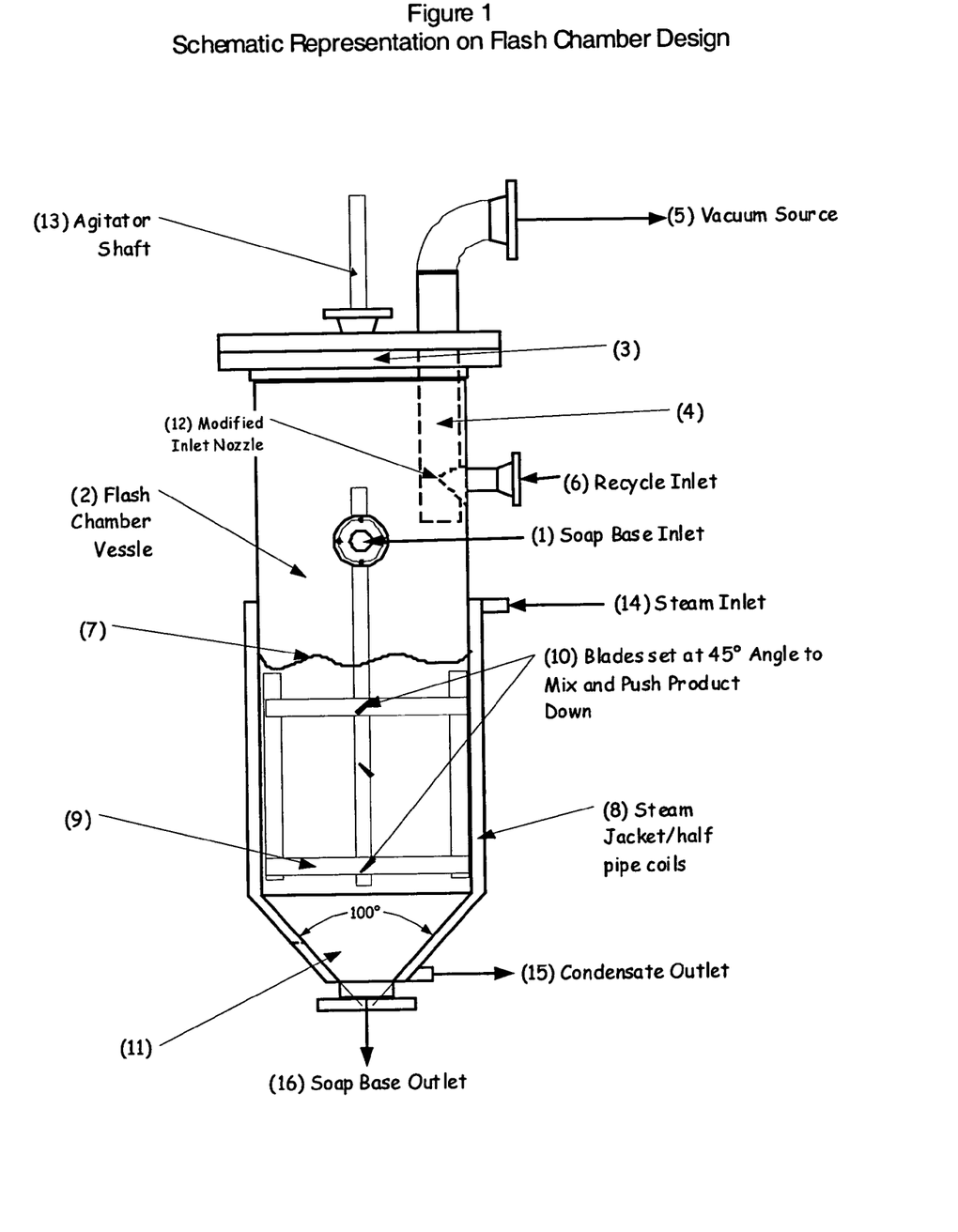
FIG. 1 is a schematic representation of a flash chamber of this invention.

Because of the higher concentration of water and methanol, and the heavier soap during the manufacture of diacid lithium complex greases on an in-line grease unit (ILGU), it has been found that with current ILGU flash chamber, the soap will tend to clog the flash chamber. This leads to incomplete removal of the water and methanol, a clogged flash chamber/vacuum system, and soap base build up on the walls of the flash chamber. To correct this problem, a new flash chamber efficiently removes the volatile components of the diacid lithium complex greases. This new flash chamber is shown in FIG. 1.

The preferred flash chamber has a cylindrical vessel (2) with a length to inner diameter ratio of ≧3.2:1, alternatively 3.2:1 to 2.1:1, and alternatively 2.625:1.

The cylindrical vessel (2) has a covered top end (3) and a downwardly sloped conical shaped bottom end (11). The covered top end (3) preferably can be opened for cleaning. The bottom end (11) has an included angle ≧90°, alternatively 90° to 120°, alternatively 95° to 105°, and alternatively 100°. This wide angle helps prevent bridging of the soap base as it slumps to the bottom of the chamber. The angle is measured inside face to opposing inside face of the cone. The largest diameter of the cone is proximate to the bottom of the flash chamber. The smallest diameter of the cone terminates in a soap base outlet (16) for removal of an at least partially devolatilized reaction product.

The flash chamber has a soap base inlet (1) for introducing an at least partially saponified reaction product into the vessel (2). A recycle inlet (6) introduces at least partially saponified reaction product through a inlet nozzle (12) into the vessel (2). A vacuum source (5) partially evacuates the vessel (2) through a conduit (4).

The usual upper level of the soap base (7) normally does not foam above the soap base inlet (1) except for potential surges that should always be below the vacuum source (5). This inlet nozzle (12) forces at least partially devolatilized reaction product downwardly into the vessel towards the bottom of the flash chamber. The structure of the inlet nozzle (12), and recycle inlet (6) preferably is downward directed to help knock down existing foam in the flash chamber. The soap base inlet (1), recycle inlet (6), inlet nozzle (12), conduit (4), and vacuum source (5) are in the side or top of the cylindrical vessel above the normal level of the grease (7).

An agitator (13) is positioned within the vessel above the conical shaped bottom end (11). The agitator (13) is provided with a plurality of blades (10) oriented at 15° to 75° (from vertical), alternatively 30° to 55°, alternatively 42° to 48°, and alternatively 45°, forces saponified reaction product downwardly under conditions of use. Preferably the agitator includes a paddle (9) which optionally may touch or hold the blades (10).

A heat transfer mechanism (8) can be added around at least part of the exterior of the cylindrical vessel. Preferably this is a steam heat jacket to improve heating capability.

When used in an ILGU process, the flash chamber is preferably operated at about 175° C. to about 200° C., alternatively 175° C. to 196° C., and alternatively 180° C. to 190° C. The flash chamber is operated under a sufficient vacuum to at least partially remove the volatiles from the saponified reaction product. This is an absolute pressure of about 88 kPa(a)

to about 101 kPa(a) and alternatively an absolute pressure of about 90 kPa(a) to about 100 kPa(a).

This flash chamber can also be used for removing solvent from other thick bases. This flash chamber also removes the limiting step in using the following in-line grease unit (ILGU) with low molecular weight complexing agents having 5 or 6 carbon atoms.

Figure 2:
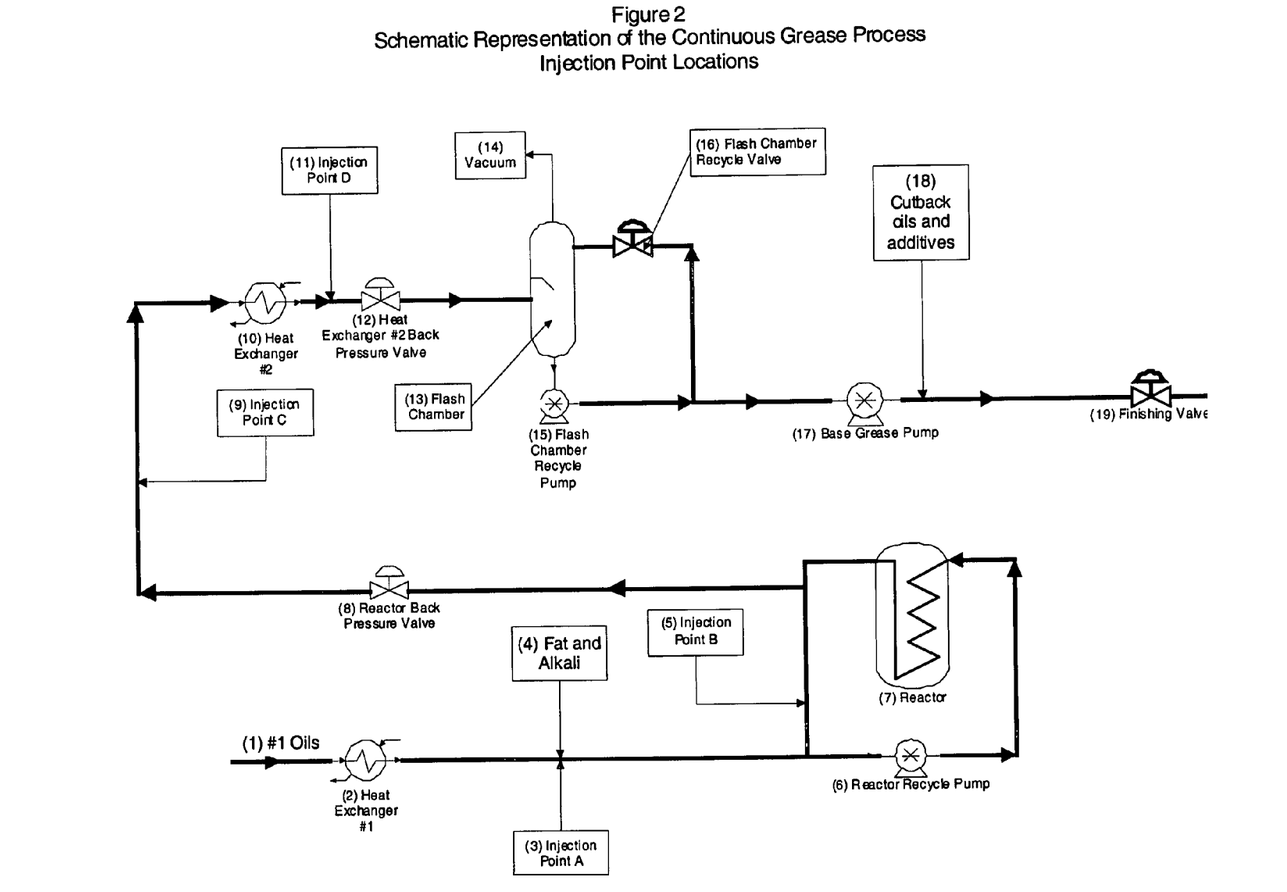
FIG. 2 is a schematic representation of a continuous process for manufacturing soap thickened grease incorporating the improvement of the present invention.

FIG. 2 shows the general flow diagram of this invention's in-line grease unit (ILGU) and identifies four injection points (A-D) to introduce the complexing agents. The preferred injection point is C. Alternative preferred injection points are A, B, or C.

Ranges of preferred operating conditions are:

| TEMPERATURES | | |
|---|---|---|
| Heat Exchanger 1 (1) | 145-200 | ° C. |
| Reactor (7) | 145-200 | ° C. |
| Heat Exchanger #2 (10) | 175-200 | ° C. |
| Flash Chamber (13) | 175-200 | ° C. |
| PRESSURES | | |
| Reactor Back Pressure Valve (8) | 500-1500 | kPa (g) |
| Flash Chamber Recycle Valve (16) | 100-1500 | kPa (g) |
| Heat Exchanger 2 Back Pressure (12) | 100-1000 | kPa (g) |
| Shear Valve Pressure (19) | 0-2000 | kPa (g) |

In an alternative embodiment, the inclusive area between the reactor (7) and heat exchanger #2 (10) is the reaction zone where the complexing agent reacts. The reaction zone is preferably at about 121° C. (250° F.) to about 204° C. (400° F.). Preferably, the complexing agent is added into injection point C in this embodiment.

A flow meter can be placed in the reactor loop and flash chamber loop to check for changes in flow rate in the loop due to clogging or pump failure.

The current invention describes a method of producing complex greases via continuous in-line process that exhibit excellent structural stability, which is at least equivalent to conventional batch processes.

Figure 5:
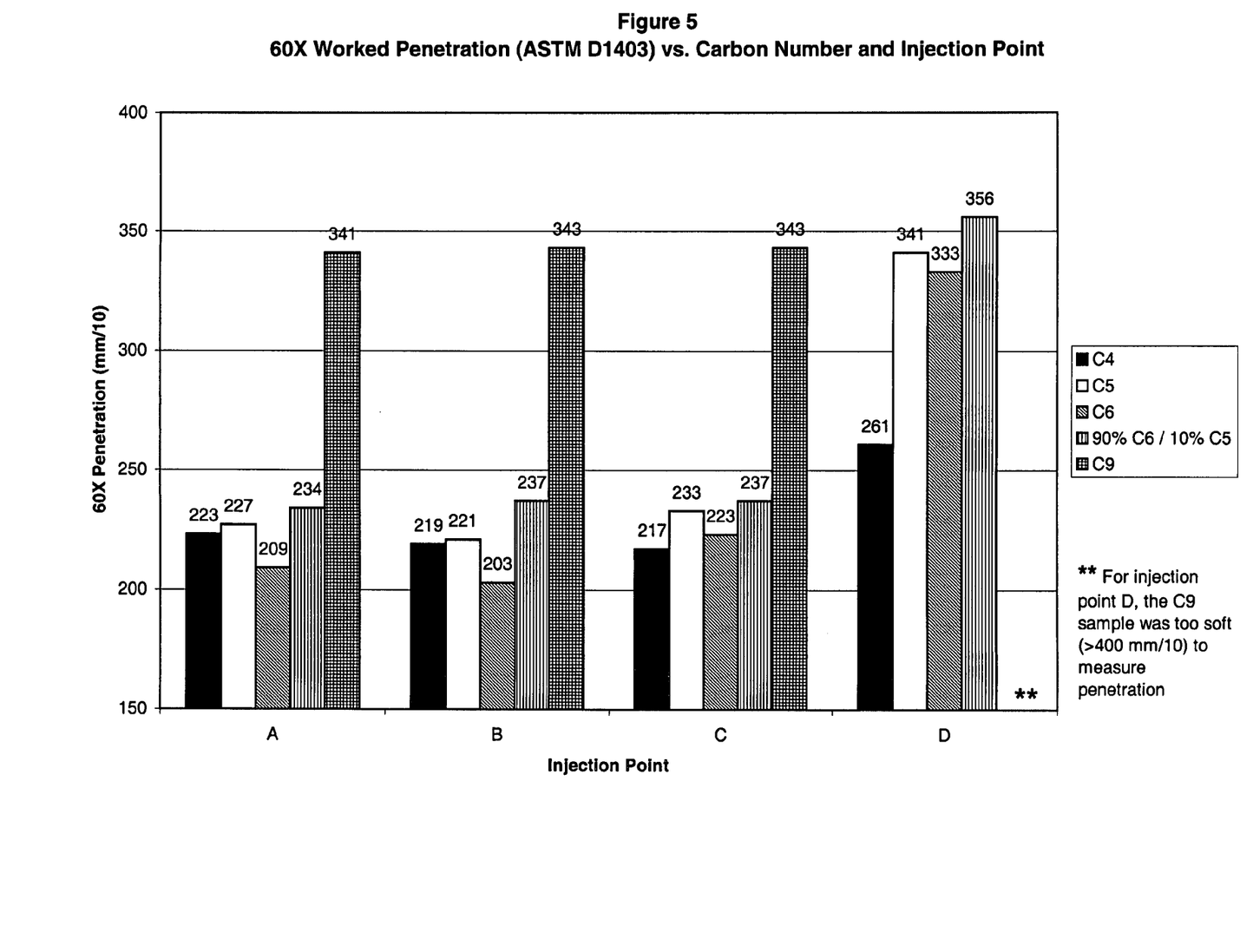
FIG. 5 is 60X worked penetration (D1403) vs. complexing agent carbon number and injection point for C4, C5, C6, and 90:10 C6:C5 mixtures.

Lithium complex greases made by the improved process of this invention preferably have a penetration split (60X-UW) of within −20 mm/10 to +10 mm/10, a roll stability (D1831) of <30 mm/10 (preferably <20 mm/10), and a dropping point (D2265) of >240° C. Greases made by the improved process of this invention with a base oil with a viscosity of 90 to 110 cSt @ 40° C. and a fatty matter wt % (FM %) within 13% to 13.5%, preferably also have a 60X worked penetration (D1403) of <280 mm/10. The greases of Examples 2-4, hereinafter described, are within this range while those of comparative Examples 1 and 5 are outside this range. FIG. 5 shows improved 60X worked penetration (D1403) enabled by this invention.

Figure 3:
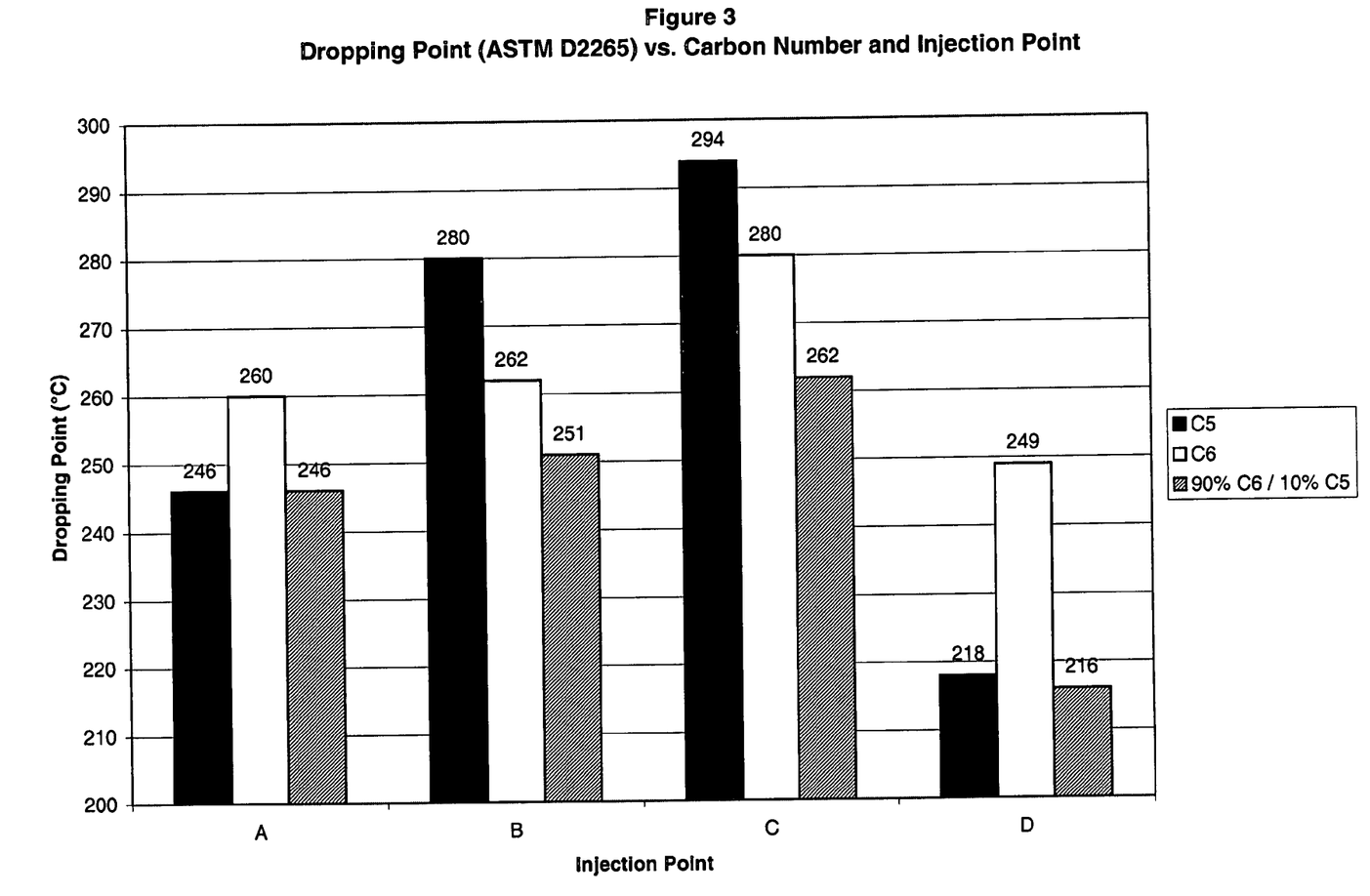
FIG. 3 is a bar graph of dropping point (D2265) vs. complexing agent carbon number and injection point for C5, C6, and 90:10 C6:C5 mixtures.

In the ASTM D2265 dropping point, simple lithium greases are generally <180° C. and lithium complexes are generally >240° C. FIG. 3 shows that C is the preferred injection point for dropping point.

The thickener efficiency is a measure of how much thickener is required to get a desired grease consistency or thickness. This can be measured using the 60X-penetration test (ASTM D217). The 100,000 stroke penetration is preferred ASTM D217 test. The harder or thicker the grease at a given thickener content (wt % fatty matter in the grease, FM %), the more efficient the thickener.

Figure 4:
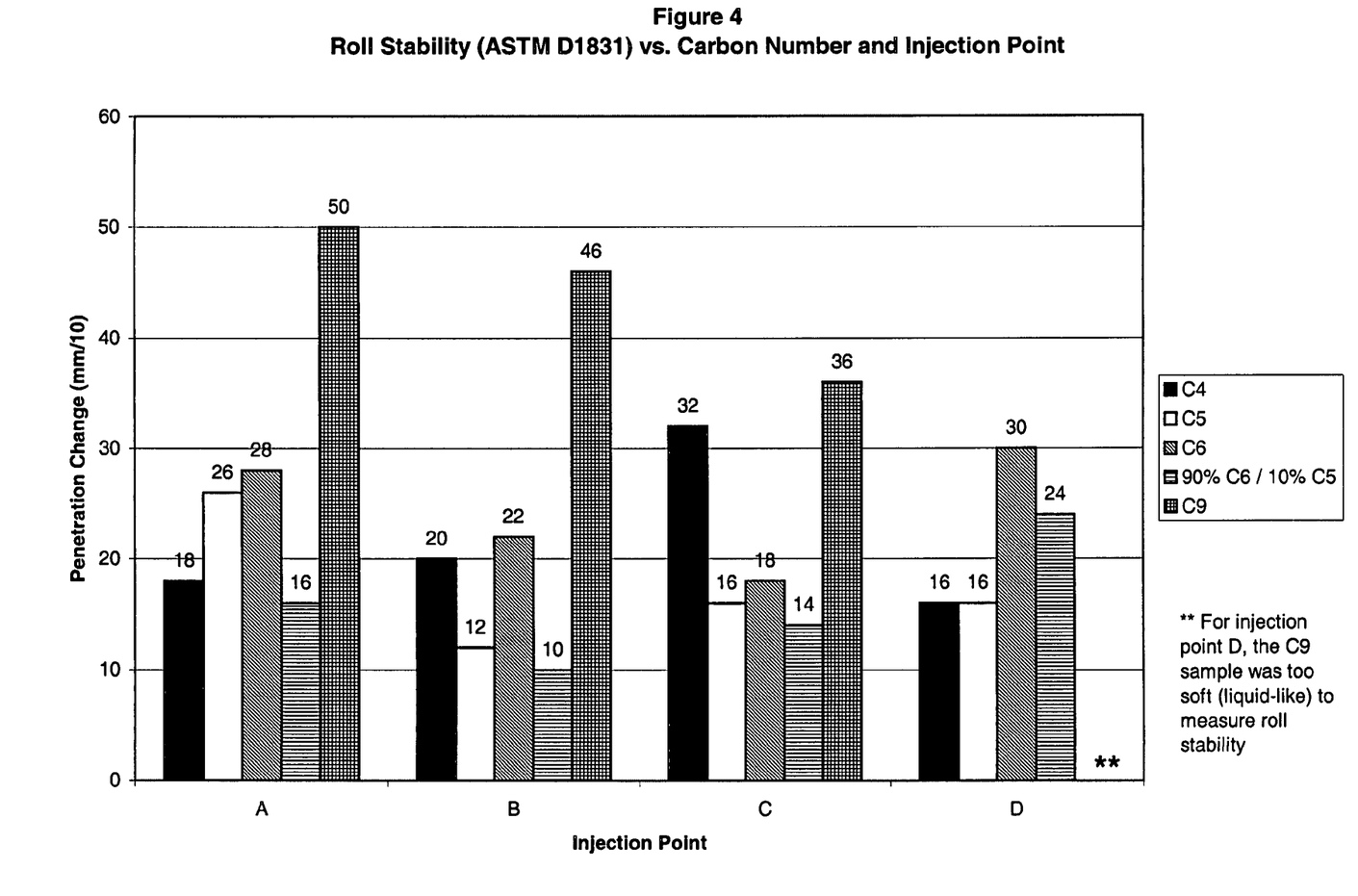
FIG. 4 is a bar graph of roll stability (D1831) vs. complexing agent carbon number and injection point for C4, C5, C6, and 90:10 C6:C5 mixtures.
Figure 6:
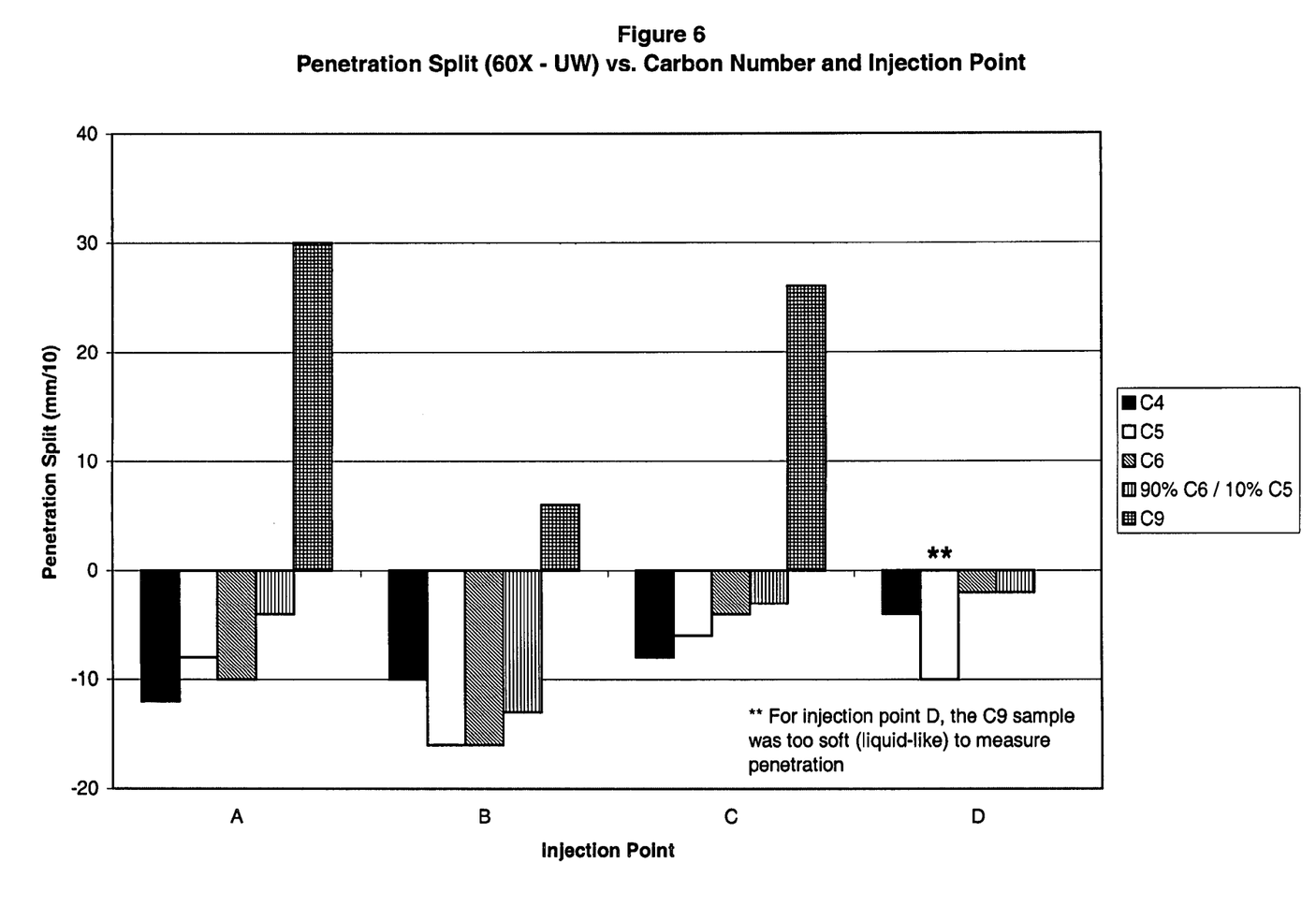
FIG. 6 is the penetration split (60X-UW) vs. complexing agent carbon number and injection point for C4, C5, C6, and 90:10 C6:C5 mixtures.

The structural stability can be evaluated by looking at the difference between the unworked and 60X penetrations (ASTM D217), and the penetration after shearing in the Shell Roll Tester (ASTM D1831). The ASTM D1831 is preferably run for two hours. FIG. 6 shows improved penetration split (60X-UW) enabled by this invention. Roll stability shows whether a grease will become softer or harder during shearing. Low roll stability numbers are preferable. FIG. 4 shows the improved roll stability enabled by this invention.

Table 1 shows the comparison of these parameters on test samples of lithium complex greases manufactured using either dimethyl azelate or a combination of dimethyl adipate (90 wt %) and dimethyl guterate (10 wt %). The reactions were carried out using identical base oils and thickener contents with the complexing agent alternatively added in one of the four injection points (A-D). Table 1 shows the improved properties from using dimethyl glutarate (DMG), dimethyl adipate (DMA), and mixtures thereof instead of dimethyl azelate (DMZ).

TABLE 1

| inject point | Diacid | UW mm/10 | 60X mm/10 | Pen Split mm/10 | D1831 mm/10 | Drop Point D2265 ° C. | FM % | Base Oil Viscosity cSt @ 40° C. |
|---|---|---|---|---|---|---|---|---|
| A | DMZ | 311 | 341 | 30 | 50 | >300 | 13.2 | 105 |
| B | DMZ | 337 | 343 | 6 | 46 | >300 | 13.2 | 105 |
| C | DMZ | 317 | 343 | 26 | 36 | >300 | 13.2 | 105 |
| D | DMZ | Too soft to measure penetration (liquid) | | | | | 13.2 | 105 |
| A | DMA/DMG | 238 | 234 | −4 | 16 | 246 | 13.2 | 105 |
| B | DMA/DMG | 250 | 237 | −13 | 10 | 251 | 13.2 | 105 |
| C | DMA/DMG | 240 | 237 | −3 | 14 | 262 | 13.2 | 105 |
| D | DMA/DMG | 358 | 356 | −2 | 24 | 216 | 13.2 | 105 |

In the cases where dimethyl azelate (DMZ) were used, the dropping points for injection points A, B, and C were very high (>300° C.) however, for D, a dropping point could not be measured because the grease did not become heavy enough to even be considered a grease. For the DMZ, in injection points A, B, and C, the efficiency of the grease was poor (grease was fairly soft). For A and C there was also a large difference between the unworked and 60X penetrations showing structural instability. Poor structural stability was also demonstrated in the Shell Roll shear stability test with injection points A, B, and C. An efficient grease uses less thickener to achieve the same penetration grade.

When the shorter chain diacid esters dimethyl adipate and dimethyl guterate (DMA/DMG) were used, acceptable dropping points were obtained for injection points A, B, and C. In addition, the efficiency of these greases were much better than with the DMZ samples (much heavier grease). In all three cases, the structural stability was better than for DMZ and the best conditions appear to be injection at point C. Injection point D gave a very inefficient grease. Unexpectedly, the above data shows that a good structurally stable diacid lithium complex grease with acceptable efficiency can only be obtained on an ILGU when shorter chain diacids (or esters) are used and the points where they can be injected are restricted to before the second heat exchanger.

Table 2 shows the improved properties of greases made with complexing agents dimethyl glutarate, dimethyl adipate, glutaric acid, adipic acid, and mixtures thereof. Table 2 shows greases made from 26.536 wt % 100 cSt (@ 40° C.) polyalphaolefin, 54.312 wt % 6 cSt (@ 40° C.) polyalphaolefin, 3.008 wt % lithium hydroxide monohydrate, 13.248 wt % methyl 12-hydroxystearate, and 2.897 wt % complexing agent (listed in Table 2). The combined base oil viscosity was 105 cSt @ 40° C. The fatty matter content in the grease was 13.2 wt % methyl 12-hydroxystearate.

The resulting mixture of base oils, lithium hydroxide, water, and MHSA entered the reactor (7) which was held at 177° C. and 1,000 kPa(g) (determined by the setpoint of the Reactor Back Pressure Valve (8)). The Reactor Recycle Pump (6) provided a sufficient recycle rate to maintain turbulent flow in the reactor coil (7).

A partly saponified material then exited the reactor and moved through the Reactor Back Pressure valve (8).

2.897 wt % dimethyl azelate was metered into the stream at Injection Point C (9). The stream then entered Heat Exchanger #2 (10), which was maintained at 183° C. and 350 kPa(g). The pressure was maintained by the Heat Exchanger #2 Back Pressure Valve (12). The stream then entered the Flash Chamber (13) which was maintained at 94 kPa(a) vacuum. The stream was then dehydrated while recycling 1 to 20 times through the Flash Chamber Recycle valve (16), which maintained a back pressure of 800 kPa(g) on the Flash Chamber Recycle Pump (15). The soap base was moved

TABLE 2

| Complexing Agent | Injection Point | UW D1403 mm/10 | 60X D1403 mm/10 | Penetration split 60X − UW mm/10 | Roll Stability D1831 mm/10 | Dropping Point D2265 ° C. |
|---|---|---|---|---|---|---|
| dimethyl azelate (C9) | A | 311 | 341 | 30 | 50 | >300 |
| dimethyl azelate (C9) | B | 337 | 343 | 6 | 46 | >300 |
| dimethyl azelate (C9) | C | 317 | 343 | 26 | 36 | >300 |
| dimethyl azelate (C9) | D | | Too soft to measure penetration | | | |
| dimethyl adipate (C6) | A | 219 | 209 | −10 | 28 | 260 |
| dimethyl adipate (C6) | B | 219 | 203 | −16 | 22 | 262 |
| dimethyl adipate (C6) | C | 227 | 223 | −4 | 18 | 280 |
| dimethyl adipate (C6) | D | 335 | 333 | −2 | 30 | 249 |
| dimethyl glutarate (C5) | A | 235 | 227 | −8 | 26 | 246 |
| dimethyl glutarate (C5) | B | 237 | 221 | −16 | 12 | 280 |
| dimethyl glutarate (C5) | C | 239 | 233 | −6 | 16 | 294 |
| dimethyl glutarate (C5) | D | 351 | 341 | −10 | 16 | 218 |
| dimethyl succinate (C4) | A | 235 | 223 | −12 | 18 | 208 |
| dimethyl succinate (C4) | B | 229 | 219 | −10 | 20 | 206 |
| dimethyl succinate (C4) | C | 225 | 217 | −8 | 32 | 208 |
| dimethyl succinate (C4) | D | 265 | 261 | −4 | 16 | 214 |
| dimethyl adipate/dimethyl glutarate (90 wt % C6/10 wt % C5) | A | 238 | 234 | −4 | 16 | 246 |
| dimethyl adipate/dimethyl glutarate (90 wt % C6/10 wt % C5) | B | 250 | 237 | −13 | 10 | 251 |
| dimethyl adipate/dimethyl glutarate (90 wt % C6/10 wt % C5) | C | 240 | 237 | −3 | 14 | 262 |
| dimethyl adipate/dimethyl glutarate (90 wt % C6/10 wt % C5) | D | 358 | 356 | −2 | 24 | 216 |

The following examples represent embodiments and comparative examples and are not meant to limit the scope of the invention.

EXAMPLE 1

Comparative

A lithium complex grease was manufactured on the ILGU depicted in FIG. 2 by the following method:

Based on the weight of all ingredients other than water, a mixture of 15.8 wt % 100 cSt @ 100° C. polyalphaolefin base oil and 39.2 wt % 6 cSt @ 100° C. polyalphaolefin base oil was introduced into the ILGU through flow meters and metering pumps, into the stream labeled "#1 Oils" (1). The viscosity of this base oil mixture was 105 cSt @ 40° C. Heat exchanger #1's (2) exit temperature setpoint was 164° C.

3.008 wt % lithium hydroxide monohydrate was dissolved in excess water and injected into the point labeled "Fat and Alkali" (4) along with 13.248 wt % molten methyl 12-hydroxysteararic acid (MHSA).

through the Base Grease Pump (17) and additional Base Oil (25.847 wt %) was metered into the soap base to give a final MHSA content of 13.2 wt % (FM %).

The soap base was then passed through the Finishing Valve (19), which was maintained at a pressure of 950 kPa(g), to produce a homogenized grease.

Flow rates throughout the process were adjusted to meet the above formulation.

The final grease had the following performance properties:
  unworked penetration (UW, ASTM D1403 with 10,000 strokes) of 317 mm/10;
  60X worked penetration (ASTM D1403) of 343 mm/10;
  penetration split (60X-UW) of 26 mm/10;
  roll stability (ASTM D1831) of 36 mm/10; and
  dropping point (ASTM D2265) of >300° C.

As indicated by the test results above, although the grease exhibited a high dropping point, the penetration split and roll stability indicate a poor degree of structural stability. Also, the high UW penetration indicated an inefficient grease structure.

EXAMPLE 2

Grease manufactured by the above process had the same formulation as Example 1, except using dimethyl adipate as the complexing agent. The grease had the following performance properties:
- UW (D1403) of 227 mm/10;
- 60X worked penetration (D1403) of 223 mm/10;
- penetration split (60X-UW) of −4 mm/10;
- roll stability (D1831) of 18 mm/10; and
- dropping point (D2265) of 280° C.

EXAMPLE 3

Grease manufactured by the above process had the formulation had the same formulation as Example 1, except using dimethyl glutarate as the complexing agent. The grease had the following performance properties:
- UW (D1403) of 239 mm/10;
- 60X worked penetration (D1403) of 233 mm/10;
- penetration split (60X-UW) of −6 mm/10;
- roll stability (D11831) of 16 mm/10; and
- dropping point (D2265) of 294° C.

EXAMPLE 4

Grease manufactured by the above process had the same formulation as Example 1, except using a mixture of 90 wt % dimethyl adipate and 10 wt % dimethyl glutarate as the complexing agent. The grease had the following performance properties:
- UW (D1403) of 240 mm/10;
- 60X worked penetration (D1403) of 237 mm/10;
- penetration split (60X-UW) of −3 mm/10;
- roll stability (D1831) of 14 mm/10; and
- dropping point (D2265) of 262° C.

EXAMPLE 5

Comparative

Grease manufactured by the above process had the same formulation as Example 1, except using dimethyl succinate as the complexing agent. The grease had the following performance properties:
- UW (D1403) of 225 mm/10;
- 60X worked penetration (D1403) of 217 mm/10;
- penetration split (60X-UW) of −8 mm/10;
- roll stability (D1831) of 32 mm/10; and
- dropping point (D2265) of 208° C.

This dropping point of 208° C. shows that dimethyl succinate did not form a complex grease.

What is claimed is:

1. A method comprising:
    having a continuous grease manufacturing process wherein a saponifiable material is reacted with a complexing agent and an aqueous solution of a metal base in a reactor to produce a saponification reaction product,
    introducing the saponification reaction product into a flash chamber to remove water present in said saponification reaction product to form a dehydrated saponification reaction product,
    passing the dehydrated saponification reaction product through a shear valve, and
    adding a lubricating oil to the dehydrated saponification reaction product to produce a grease product, the improvement which comprises:
    using a complexing agent that is at least one member selected from the group consisting of dialkyl glutarate, dialkyl adipate, glutaric acid, adipic acid, and mixtures thereof, wherein alkyl has 1 to 8 carbon atoms and a flash chamber comprising a cylindrical vessel with a length to inner diameter ratio of $\geqq 3.2:1$, the vessel having a covered top end and a downwardly sloped conical shaped bottom end with an included angle $\geqq 90°$, terminating in an outlet for removal of an at least partially devolatilized reaction product;
    an inlet for introducing an at least partially saponified reaction product into the vessel;
    a conduit in communication with a vacuum source, extending into the top end of the vessel, so that under conditions of use the conduit will terminate above the level of the at least partially saponified reaction product;
    an inlet for introducing recycled at least partially devolatilized reaction product downwardly into the vessel, said inlet located in the top or side and directed in a downward direction into the flash chamber, so that under conditions of use the conduit will terminate above the level of the at least partially saponified reaction product; and
    an agitator positioned within the vessel above the conical shaped bottom end, the agitator provided with a plurality of blades oriented at 15° to 75° from vertical to force saponified reaction product downwardly under conditions of use.

2. The method according to claim 1, wherein the improvement further comprises adding the complexing agent between the reactor and the flash chamber.

3. The method according to claim 1, wherein the flash chamber further comprises a steam jacket around at least part of the exterior of the cylindrical vessel;
    the included angle of the conical bottom is 95° to 105°; and
    the blades are angled at 30° to 55° from vertical.

4. A method of making a grease having a penetration split (60X-UW) of within −20 mm/10 to +10 mm/10, a roll stability (D1831) of <30 mm/10, and a dropping point (D2265) of >240° C., by an improvement according to claim 1.

5. A method comprising, preparing a high dropping point lithium complex soap grease comprising continuously introducing a reaction mixture comprising a complexing agent, a hydroxy fatty acid, a lithium base and a lubricating oil into a reaction zone, to form a saponified material soap and volatile components which are continuously introduced into a dehydration zone comprising a flash chamber, the improvement which comprises:
    using as a complexing agent at least one member selected from the group consisting of dialkyl glutarate, dialkyl adipate, glutaric acid, adipic acid, and mixtures thereof, wherein alkyl has 1 to 8 carbon atoms and a flash chamber comprising a cylindrical vessel with a length to inner diameter ratio of $\geqq 3.2:1$, the vessel having a covered top end and a downwardly sloped conical shaped bottom end with an included angle $\geqq 90°$, terminating in an outlet for removal of an at least partially devolatilized reaction product;
    an inlet for introducing an at least partially saponified reaction product into the vessel;
    a conduit in communication with a vacuum source, extending into the top end of the vessel, so that under conditions of use the conduit will terminate above the level of the at least partially saponified reaction product;

an inlet for introducing recycled at least partially devolatilized reaction product downwardly into the vessel, said inlet located in the top or side and directed in a downward direction into the flash chamber, so that under conditions of use the conduit will terminate above the level of the at least partially saponified reaction product; and an agitator positioned within the vessel above the conical shaped bottom end, the agitator provided with a plurality of blades oriented at 15° to 75° from vertical to force saponified reaction product downwardly under conditions of use.

6. The method of claim 5, wherein the hydroxy fatty acid, lithium base, and lubricating oil are first introduced into the reaction zone and the complexing agent is added to the saponifiable material before the introduction into the dehydration zone.

7. The method of claim 5, wherein the hydroxy fatty acid, lithium base, and lubricating oil are first introduced into the reaction zone and at least a portion of the saponifiable material is removed and recycled through the reaction zone and wherein the complexing agent is added to the saponifiable material being recycled.

8. The method of claim 5, wherein the reaction zone is at about 121° C. (250° F.) to about 204° C. (400° F.); and the hydroxy fatty acid is at least one member selected from the group consisting of methyl-12-hydroxystearate, 12-hydroxy stearic acid, and mixtures thereof as the hydroxy fatty acid.

9. A method of making a grease having a penetration split (60X-UW) of within −20 mm/10 to +10mm/10, a roll stability (D1831) of <30 mm/10, and a dropping point (D2265) of >240° C., by an improvement according to claim 5.

10. A method according to claim 5, wherein the grease, when made by the improvement according to claim 5 with a base oil with a viscosity of 90 to 110 cSt @ 40° C. and a FM % within 13% to 13.5% has a 60X worked penetration (D1403) of <280 mm/10.

11. A method according to claim 5, wherein the complexing agent is dimethyl glutarate; and the grease product has a roll stability (D1831) of <20 mm/10.

12. A method according to claim 5, wherein the complexing agent is dimethyl adipate.

13. A method according to claim 5, wherein the complexing agent is glutaric acid.

14. A method according to claim 5, wherein the complexing agent is adipic acid.

15. A method according to claim 5, wherein the complexing agent is a mixture of about 90 wt % dimethyl adipate and about 10 wt % dimethyl glutarate; and the grease product has a roll stability (D1831) of <20 mm/10.

16. A method according to claim 5, wherein the complexing agent is a mixture of adipic acid and glutaric acid; and the grease product has a roll stability (D1831) of <20 mm/10.

* * * * *